BALANCED DEMODULATOR IN A BALANCED MODULATING SYSTEM

Filed June 18, 1954 2 Sheets-Sheet 1

*INVENTORS.*
G. A. LEAP
D. M. KALTENBACHER
*BY* Killman and Kerst
*ATTORNEYS.*

BALANCED DEMODULATOR IN A BALANCED MODULATING SYSTEM

Filed June 18, 1954 2 Sheets-Sheet 2

INVENTORS.
G.A. LEAP
D. M. KALTENBACHER
BY
Killman and Kerst
ATTORNEYS

United States Patent Office 2,801,335

Patented July 30, 1957

2,801,335

BALANCED DEMODULATOR IN A BALANCED MODULATING SYSTEM

Gordon A. Leap and Dominic M. Kaltenbacher, Baltimore, Md., assignors to Bendix Aviation Corporation, Towson, Md., a corporation of Delaware Application June 18, 1954, Serial No. 437,710

2 Claims. (Cl. 250—27)

This invention relates to modulating systems and in particular, to balanced modulating systems.

In a balanced modulator it is necessary to maintain tubes that are sufficiently identical to confine the distortion within allowable limits. For the same degree of distortion, the problem of matching tubes becomes more significant as the percentage of modulation is increased.

In U. S. Patent 2,476,977, issued to Paul G. Hansel, entitled "Radio Direction Finder," a method of modulation is employed which greatly reduces the difficulty of maintaining matched tubes in a balanced modulator. In this system, it is necessary to apply one hundred percent modulation to the sweep signal supplied to the plates of a cathode ray tube. As stated supra, if one hundred percent modulation was performed in the balanced modulator, a severe problem in matching tubes would result, but by reducing the degree of modulation at this point, the problem of tube matching may be substantially reduced. This is accomplished by introducing another modulator and an oscillator. As the second modulator is not of the balanced type, no problems in tube matching are present and therefore one hundred percent modulation may be performed by the modulating signal on the carrier signal supplied by the oscillator. A detailed explanation of this method is presented later.

The frequency of the carrier signal supplied by the oscillator is generally in the R. F. range, as it is within this range that best performance of the system is obtained. Because of this and the tuned circuits employed, the signals applied to the plates of the cathode ray tube are also in the R. F. range but modulated at an audio frequency rate.

Producing the image on the front of the cathode ray tube by R. F. signals, although necessary under certain requirements, entails a number of problems in such a system. Some of these problems are:

1. As the information in the image is contained in the modulation envelope, the necessity of illuminating more of the front of the tube than necessary limits the brilliancy of the image because of the inefficient use of the available electrons.

2. As the signals being applied to the plates of the cathode ray tube are in the R. F. range, the effect of the interplate capacitance causes a distortion in the image on the front of the tube.

3. If, as in the aforementioned system, it is desired to eliminate duplication of information in the image, a blanking means must be provided.

4. Because the information is presented in an R. F. signal form, care must be exercised to maintain symmetry of phase shift in the R. F. signals passing through both halves of the balanced modulator as asymmetry causes distortion to be present in the output.

The present invention provides a means of circumventing these problems by eliminating the application of R. F. signals to the cathode ray tube. The image produced on the front of the tube by this means is the envelope of the R. F. signal.

It is an object of this invention to provide a means that will produce a sharply defined image on the face of the cathode ray tube in the aforementioned system where the said image consists of the envelope of the image produced by the said system.

Another object of this invention is to provide a means whereby the desired information is displayed on the face of the cathode ray tube in the aforementioned system without the use of R. F. signals such that the affect of the inter-plate capacity of the said tube will have a negligible effect.

Another object of the present invention is to provide means that will eliminate the necessity of a blanking means as used in the aforementioned system.

A further object of the invention is to provide means that will eliminate the R. F. signals such that the necessity of maintaining circuits with identical R. F. phase shifts in both halves of the balanced modulator is deleted.

Referring to the drawings.

Figure 1:
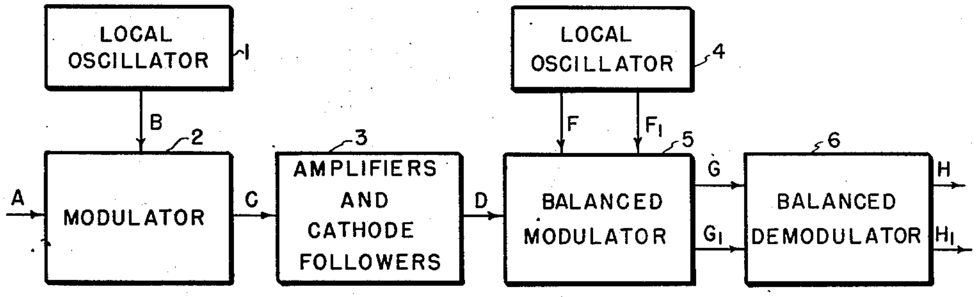
Fig. 1 illustrates a portion of a direction finding system in block form.

Referring to Fig. 1, a block diagram of a portion of an automatic direction finding system that includes the invention is shown. In this portion of the system it is desired to linearally modulate the low frequency sweep signals F and $F_1$ with an intelligence signal A. A carrier signal B, produced in a local oscillator 1, is modulated in a modulator 2 by the signal A. An output signal C of the modulator 2 is therefore at the same frequency as the signal B, but amplitude modulated in accordance with the signal A. The signal C is then operated upon by the amplifiers and cathode follower 3 to produce a signal D. The signal D is then applied to a balanced modulator 5 along with the signals F and $F_1$ from a second local oscillator 4. The signals F and $F_1$ are equal in amplitude but opposite in phase sense. Signals G and $G_1$ are the output signals from the balanced modulator 5 and consist of the signal D modulated by the signals F and $F_1$ respectively. The signals G and $G_1$ are then inserted into a balanced demodulator 6 which eliminates the undesired frequencies produced in demodulation, such that signals H and $H_1$ represent the signals F and $F_1$, respectively, linearally modulated by the amplified signal A. The expressions for the signals H and $H_1$ are of the form of the well known expression for linear modulation and are:

$$H=SK_1\left(1+\frac{2K_2}{K_1}A\right)(F)$$

and $$H_1=SK_1\left(1+\frac{2K_2}{K_1}A\right)(F_1)$$

where S is the gain through the system.

Figure 2:
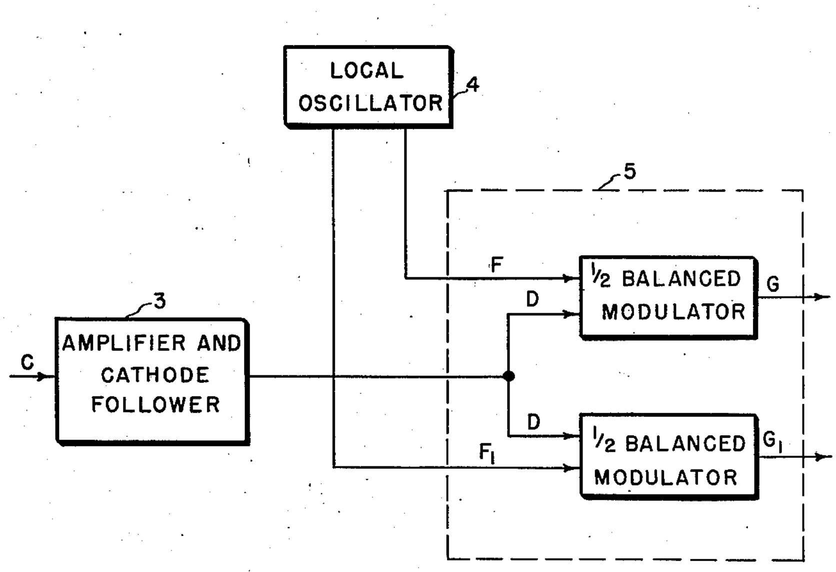
Fig. 2 illustrates a portion of Fig. 1 in more detail.

A portion of Fig. 1 is redrawn in Fig. 2 to illustrate the insertion of the signal D and the signals F and $F_1$ in the balanced modulator 5. It will be noted that the signals F and $F_1$ modulate the signal D to produce the output signals G and $G_1$ respectively.

To determine the characteristics of the signals G and $G_1$, the following discussion is presented.

Assuming that:

(1) Signal $A=E_2 \sin (\rho)t$, (2) Signal $B=E_1 \sin(\omega)t$, and (3) Modulator 2 is a linear modulator, then:

$$\text{Signal } C=K_1\left[1+\frac{2K_2}{K_1}E_2 \sin(\rho)t\right]E_1 \sin(\omega)t$$

where $K_1$ and $K_2$ are constants. Signal D differs from signal C in amplitude only. Therefore:

$$\text{Signal } D=KK_1\left[1+\frac{2K_2}{K_1}E_2 \sin(\rho)t\right]E_1 \sin(\omega)t$$

where K is the gain of amplifiers and cathode follower 3.

Assuming further that:

(1) Signal $F=E_3 \sin[(\alpha)t]$, (2) Signal $F_1=E_3 \sin[(\alpha)t+180°]$, and (3) Modulator 5 is a linear modulator, then:

$$\text{Signal } G=K_3\left\{1+\frac{2K_4}{K_3}E_3 \sin[(\alpha)t]\right\}\left\{KK_1\left[1+\frac{2K_2}{K_1}E_2 \sin(\rho)t\right]E_1 \sin(\omega)t\right\}$$

and $$\text{Signal } G_1=K_3\left\{1+\frac{2K_4}{K_3}E_3 \sin[(\alpha)t+180°]\right\}\left\{KK_1\left[1+\frac{2K_2}{K_1}E_2 \sin(\rho)t\right]E_1 \sin(\omega)t\right\}$$

where $K_3$ and $K_4$ are new constants. Rearranging the right hand sides of these two equations produces:

$$\text{Signal } G=K_3KK_1E_1\left\{1+\frac{2K_4}{K_3}E_3 \sin[(\alpha)t]\right\}\left\{1+\frac{2K_2}{K_1}E_2 \sin[(\rho)t]\right\}\left\{\sin[(\omega)t]\right\}$$

and $$\text{Signal } G_1=K_3KK_1E_1\left\{1+\frac{2K_4}{K_3}E_3 \sin[(\alpha)t+180°]\right\}\left\{1+\frac{2K_2}{K_1}E_2 \sin[(\rho)t]\right\}\left\{\sin[(\omega)t]\right\}$$

Figure 3:
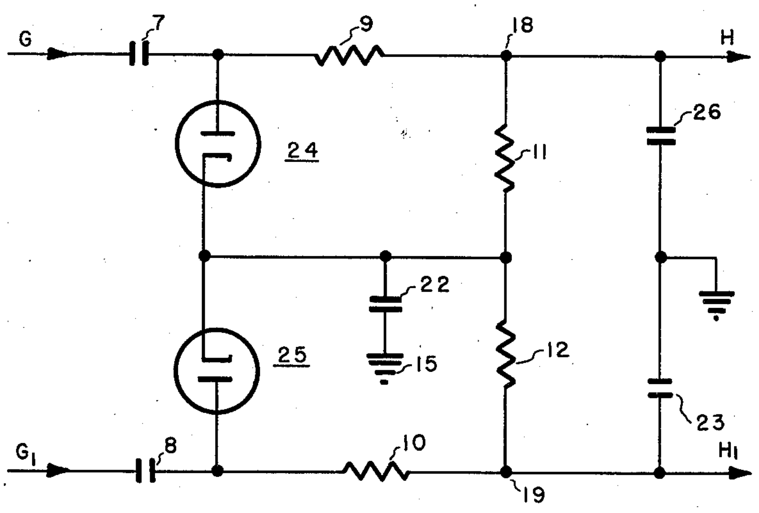
Fig. 3 is a schematic diagram of a circuit illustrating the invention.

Referring to Fig. 3, a schematic of the demodulator 6 is illustrated. When the tubes 24 and 25 demodulate the signals G and $G_1$ in a linear manner, the resulting signals will fall into two groups of frequencies. One of these groups will contain expressions involving the term $\omega$, while the second group will contain the terms $\rho$ and $\alpha$ only. As the capacitors 26 and 23 are provided for bypassing the higher frequency group to ground, the group remaining to be considered will be the second group. Referirng to the previously obtained expressions for the signals G and $G_1$, the terms involving $\rho$ and $\alpha$, when extracted and expanded, will represent the second group of expressions. These expressions in the signal G are:

$$KK_1K_3E_1\left\{1+\frac{2K_4}{K_3}E_3 \sin[(\alpha)t]\right\}\left\{1+\frac{2K_2}{K_1}E_2 \sin[(\rho)t]\right\}=$$

$$KK_1K_3E_1\left\{1+\frac{2K_4}{K_3}E_3 \sin[(\alpha)t]+\frac{2K_2}{K_1}E_2 \sin[(\rho)t]+\frac{2K_4K_2}{K_3K_1}E_3E_2 \cos[(\alpha-\rho)t]-\frac{2K_4K_2}{K_3K_1}E_3E_2 \cos[(\alpha+\rho)t]\right\}$$

By inspection, it will be readily seen that the similar expression for $G_1$ is:

$$KK_1K_3E_1\left\{1+\frac{2K_4}{K_3}E_3 \sin[(\alpha)t+180°]+\frac{2K_2}{K_1}E_2 \sin[(\rho)t]+\frac{2K_4K_2}{K_3K_1}E_3E_2 \cos[(\alpha-\rho)t+180°]-\frac{2K_4K_2}{K_3K_1}E_3E_2 \cos[(\alpha+\rho)+180°]\right\}$$

The last two expressions represent the signals existing across the tubes 24 and 25 respectively and are the signals that, when operated upon by the rest of the circuitry in the demodulator, produce the desired output.

Figure 4:
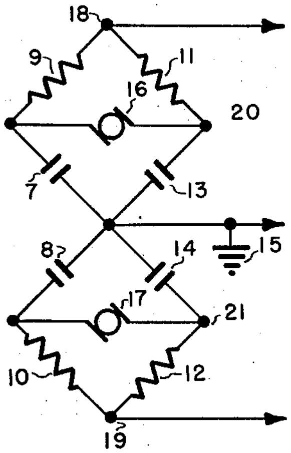
Fig. 4 is a schematic diagram of two bridge circuits.

To facilitate in the explanation of the operation of the demodulator 6, a partial discussion on bridge circuits is presented in conjunction with Fig. 4. Fig. 4 depicts two bridge circuits consisting of resistors 9, 10, 11 and 12, capacitors 7, 8, 13 and 14 and generators 16 and 17. In order to create the proper conditions for the use of this discussion in the explanation of the operation of the demodulator 6, the components and generators of one circuit are made identical in value with the respective components and generator of the other circuit such that the circuits are mirror images of one another. Furthermore, the values of the components are chosen such that the ratio of the resistance of resistor 9 to the resistance of the resistor 11 is the same as the ratio of the capacitance of the capacitor 7 to the capacitance of the capacitor 13. Under these conditions, no potential will exist between the points 18 and 19 and the ground reference 15 for all frequencies of the generators 16 and 17 that permit the resistors and capacitors to function in their normally accepted fashions.

Figure 5:
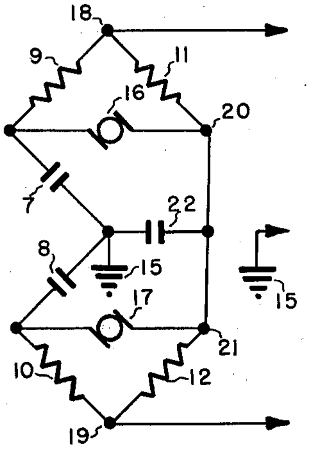
Fig. 5 is a schematic diagram of two bridge circuits with a common component.

If generators 16 and 17 produce signals that are equal in amplitude and frequency and are in phase with respect to one another, then the potentials existing from points 20 and 21 to the ground reference 15 must be in phase and equal in amplitude and frequency. This being true, the points 20 and 21 may be electrically connected. Fig. 5 depicts a schematic of the two bridge circuits with the points 20 and 21 joined and a capacitor 22 replacing the parallel combination of capacitors 13 and 14 that would exist because of the joining action. Under these conditions, zero potential will exist between points 18 and 19, point 18 and the ground reference 15, and point 19 and the ground reference 15.

If the aforementioned signals from the generators 16 and 17 are displaced from one another by 180°, then no potential will exist across the capacitor 22. Under these conditions, the potentials existing between points 18 and 19 and the ground reference 15 are equal in magnitude and frequency but are displaced 180° from one another.

Referring again to Fig. 3, the components therein that perform similar functions to the components of Fig. 5 have been provided with identification markings similar to those of Fig. 5. The capacitors 7 and 8 in Fig. 3 are returned to the ground reference 15 through the preceding stage. As was stated supra, tubes 24 and 25 demodulate the incoming signals and therefore may be considered as signal sources similar to the generators 16 and 17 in Fig. 5. Therefore, after the incoming signals G and $G_1$ have been demodulated and the higher frequency group of signals produced by the demodulation have been bypassed to the ground reference 15 by virtue of the capacitors 26 and 23, the aforementioned second group of signals will be found to be equivalent to those discussed when describing Figs. 4 and 5. This being so, the output signals H and $H_1$ will be:

$$H=KK_1K_3E_1\left\{1+\frac{2K_4}{K_3}E_3 \sin[(\alpha)t]+\frac{2K_4K_2}{K_3K_1}E_3E_2 \cos[(\alpha-\rho)t]-\frac{2K_4K_2}{K_3K_1}E_3E_2 \cos[(\alpha+\rho)t]\right\}$$

and $$H_1=KK_1K_3E_1\left\{1+\frac{2K_4}{K_3}E_3 \sin[(\alpha)t+180°]+\frac{2K_4K_2}{K_3K_1}E_3E_2 \cos[(\alpha-\rho)t+180°]-\frac{2K_4K_2}{K_3K_1}E_3E_2 \cos[(\alpha+\rho)t+180°]\right\}$$

where the inphase signals have been cancelled by virtue of the bridge circuit arrangement. The D. C. term is eliminated by the isolation from the ground reference 15 provided by capacitors 7, 8 and 22.

Factoring produces:

$$H=(2KK_4E_1)K_1\left\{1+\frac{2K_2}{K_1}E_2\sin[(\rho)t]\right\}\left\{E_3\sin[(\alpha)t]\right\}$$

and $$H_1=(2KK_4E_1)K_1\left\{1+\frac{2K_2}{K_1}E_2\sin[(\rho)t]\right\}\left\{E_3\sin[(\alpha)t+180°]\right\}$$

The last two expressions are recognized as the desired modulated output signals with a gain expression.

It will be noticed that the outputs from the balanced modulator 5 are not combined. Each output is inserted into the demodulator 6 as a separate input signal. Therefore, the R. F. components of these signals do not have to be in phase as they are not compared or combined but are by-passed to the ground reference 15 after demodulation has occurred. The necessity of maintaining circuits to provide for identical R. F. phase shift in the output signals of the balanced modulator 5 has been eliminated.

Although the operation of this invention has been described in conjunction with a portion of the system disclosed by Hansel, this is in no way meant to place any limitations on the use of the invention, as it is obvious to those skilled in the art that other applications are possible.

What is claimed is:

1. In a balanced modulator system; comprising a local oscillator, a modulator, a second local oscillator and a second modulator of the balanced type; a balanced demodulator comprising: two input terminals; two capacitors; means electrically joining each of the said input terminals to one terminal of a respective one of the said capacitors; two diode tubes; a second means electrically joining the other terminal of each of the said capacitors to the plate electrode of a respective one of the said tubes; a third capacitor; a third means electrically joining the cathode electrodes of the said tubes and one terminal of the said third capacitor; a ground reference; means electrically joining the other terminal of the said third capacitor to the said ground reference; four resistors; said resistors being serially and electrically connected; means electrically connecting the said serially connected resistors in parallel connection with the said plates of the said tubes; means electrically connecting the center junction of the said serially connected resistors to the said third means; a fourth and a fifth capacitor; means electrically connecting one terminal of each of the said fourth and fifth capacitors to a respective one of the remaining two junctions of said serially connected resistors; means electrically connecting the remaining terminals of the said fourth and fifth capacitors to the said ground reference; two output terminals; and means electrically joining each of the said output terminals to a respective one of the last mentioned junctions.

2. A balanced demodulator circuit for demodulating two input signals of the type expressed by $$KK_3\left\{1+\frac{2K_4}{K_3}E_3\sin[(\alpha)t]\right\}K_1\left\{1+\frac{2K_2}{K_1}E_2\sin[(\rho)t]\right\}\left\{E_1\sin[(\omega)t]\right\}$$

and $$KK_3\left\{1+\frac{2K_4}{K_3}E_3\sin[(\alpha)t+180°]\right\}K_1\left\{1+\frac{2K_2}{K_1}E_2\sin[(\rho)t]\right\}\left\{E_1\sin[(\omega)t]\right\}$$

where:

$K$, $K_1$, $K_2$, $K_3$ and $K_4$ are constants, $E_1$, $E_2$, and $E_3$ are maximum values of sinusoidal signals, $\alpha$ is the angular frequency of a modulating signal, $\rho$ is the angular frequency of a second modulating signal, and $\omega$ is the angular frequency of a carrier signal, to produce two output signals of the type expressed by $$2KK_4K_1E_1\left\{1+\frac{2K_2}{K_1}E_2\sin[(\rho)t]\right\}\left\{E_3\sin[(\alpha)t]\right\}$$

and $$2KK_4K_1E_1\left\{1+\frac{2K_2}{K_1}E_2\sin[(\rho)t]\right\}\left\{E_3\sin[(\alpha)t+180°]\right\}$$

comprising: two input terminals; two capacitors; means electrically joining each of the said input terminals to one terminal of a respective one of the said capacitors; two diode tubes; a second means electrically joining the other terminal of each of the said capacitors to the plate electrode of a respective one of the said tubes; a third capacitor; a third means electrically joining the cathode electrodes of the said tubes and one terminal of the said third capacitor; a ground reference; means electrically joining the other terminal of the said third capacitor to the said ground reference; four resistors; said resistors being serially and electrically connected; means electrically connecting the said serially connected resistors in parallel connection with the said plates of the said tubes; means electrically connecting the center junction of the said serially connected resistors to the said third means; a fourth and a fifth capacitor; means electrically connecting one terminal of each of the said fourth and fifth capacitors to a respective one of the remaining two junctions of the said serially connected resistors; means electrically connecting the remaining terminals of the said fourth and fifth capacitors to the said ground reference; two output terminals; and means electrically joining each of the said output terminals to a respective one of the last mentioned junctions.

References Cited in the file of this patent

UNITED STATES PATENTS

| | | |
|---|---|---|
| 2,220,350 | Purington | Nov. 5, 1940 |
| 2,256,070 | Weagant | Sept. 16, 1941 |